Patented Feb. 15, 1938

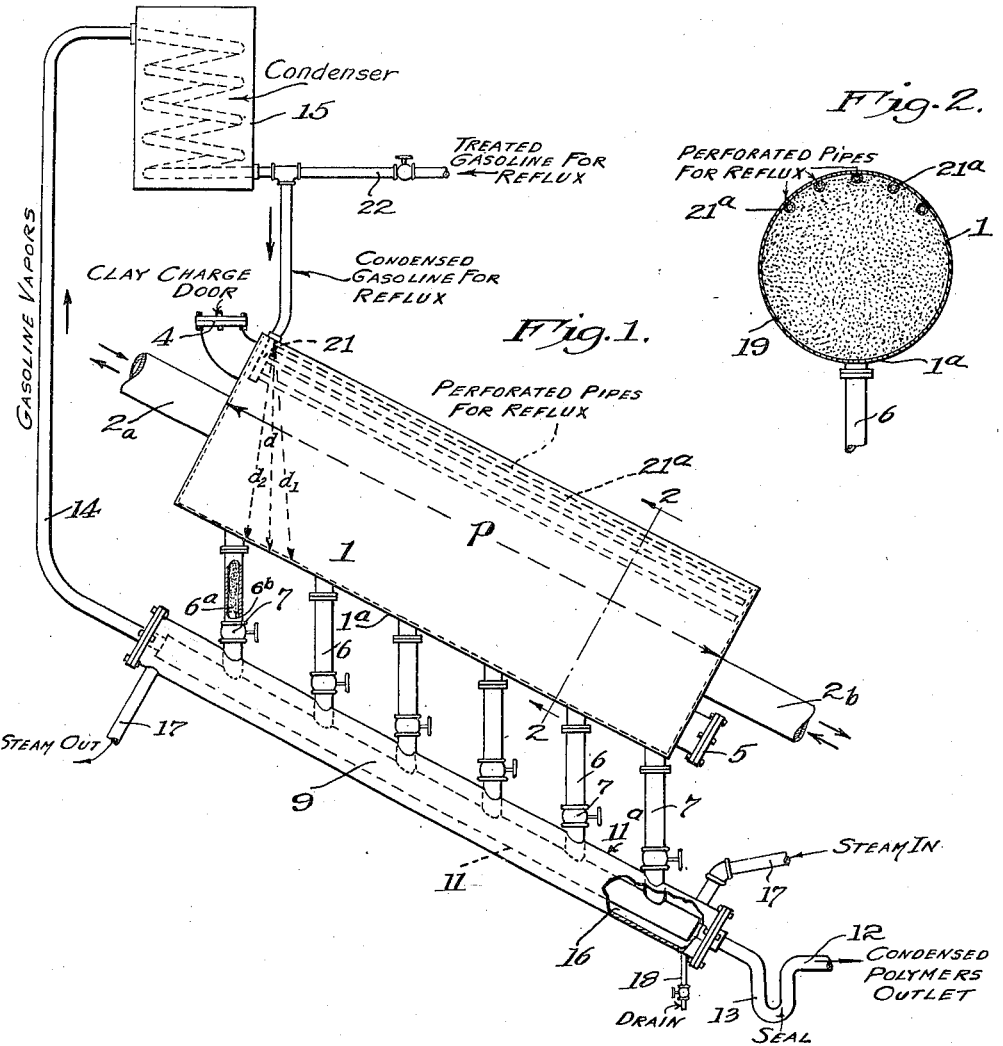

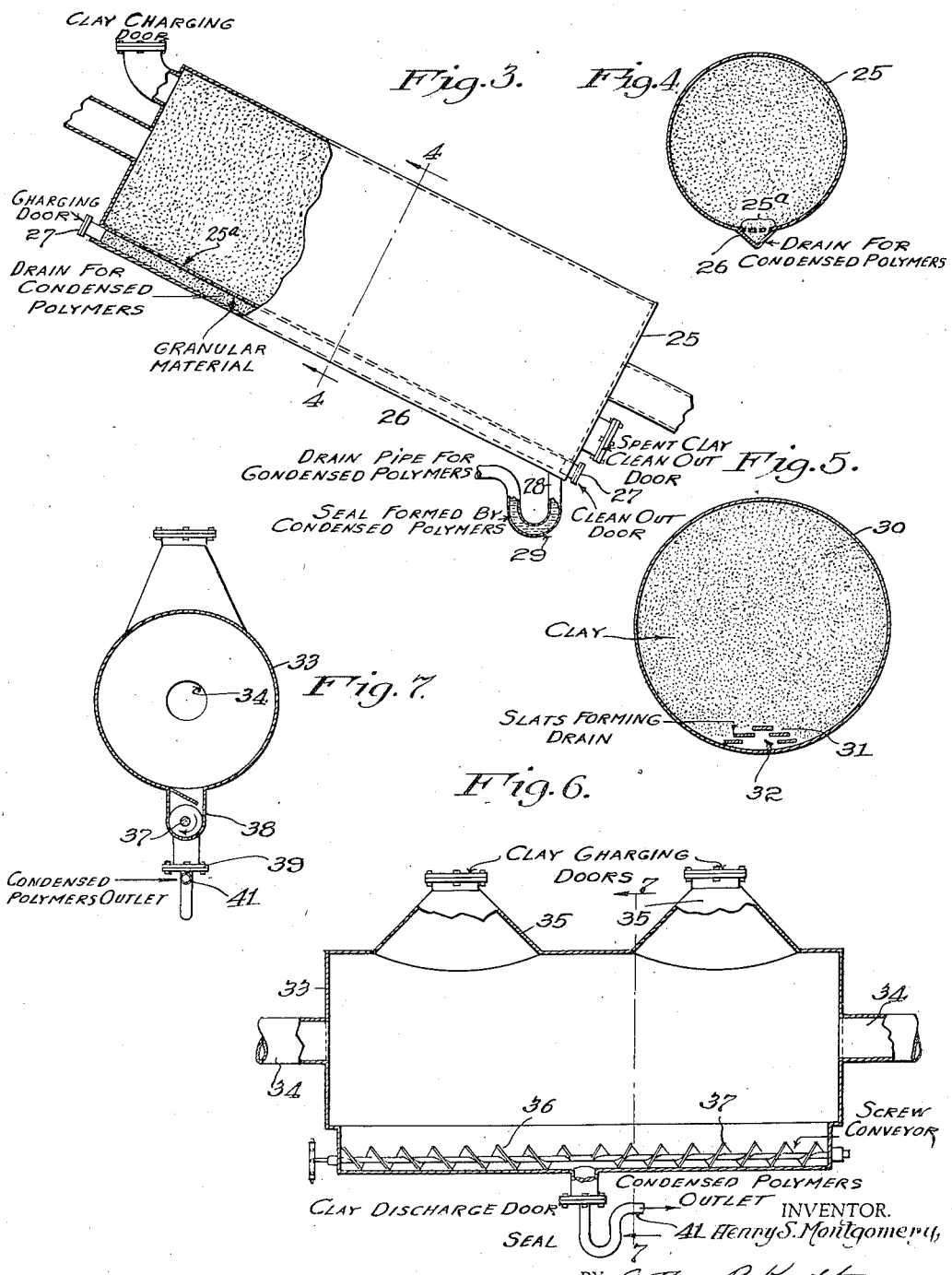

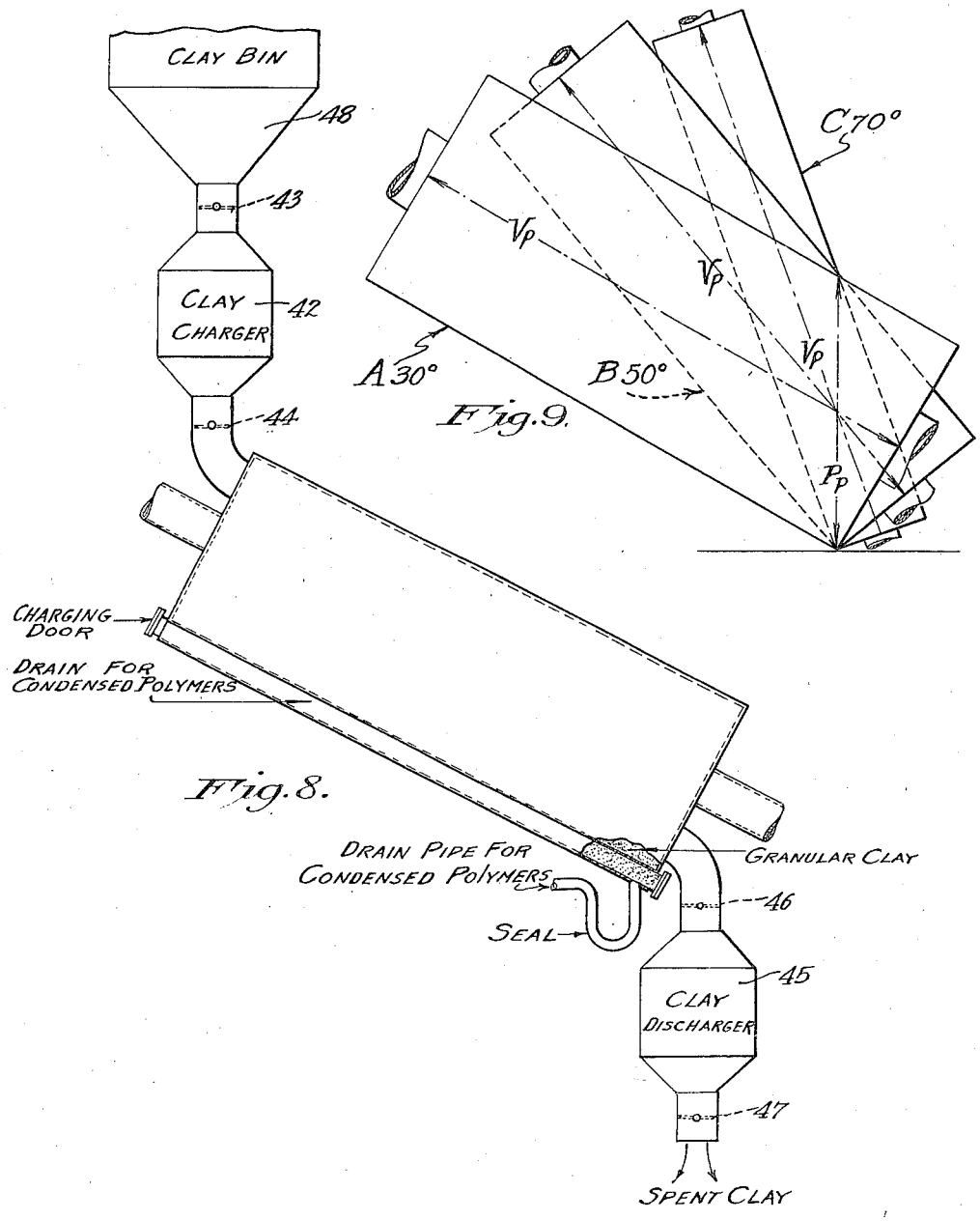

2,108,690

UNITED STATES PATENT OFFICE 2,108,690

METHOD FOR VAPOR PHASE TREATMENT OF PETROLEUM DISTILLATES

Henry S. Montgomery, South Pasadena, Calif., assignor of one-half to Alfred W. Knight, San Marino, Calif.

Application March 30, 1932, Serial No. 602,096

5 Claims. (Cl. 196—96)

The present invention relates to the purification of hydrocarbon vapors, such as "cracked" or "straight-run" petroleum distillates by the use of an adsorbent polymerizing agent, such as decolorizing or bleaching clay, fuller's earth or the like, and particularly to a method for the treatment of such petroleum distillates in the vapor-phase.

The principal object of the present invention is to provide a method for the vapor-phase treatment of petroleum distillates with the use of an adsorbent material, in such manner that the undesirable relatively high boiling-point liquid polymerization products formed during such treatment are rapidly and efficiently removed from the adsorbent so as to preserve the latter in an active condition for as long a period as possible, whereby the relative efficiency of such adsorbent polymerizing agent is materially increased.

One of the major objects of the invention is to provide a method for the above-mentioned purpose, wherein the polymers formed by the contact of petroleum vapors with the solid adsorbent polymerizing agent are allowed to drain from said agent through a relatively short path as compared with the minimum length of path of the vapors through said agent, whereby said polymerizing agent is maintained relatively clean of such polymers during such treatment, and the effective life and efficiency thereof are materially increased.

A further major object of the present invention is to provide a method for the above-mentioned purpose in which petroleum distillate vapors are caused to pass through a body of adsorbent polymerizing agent in such manner that the path of such vapors through said body is of relatively greater length than the maximum vertical thickness of said body, and in which the condensed polymers formed by contact of said vapors with said body are drained therethrough in a plurality of paths transverse to the actual direction of the minimum path of said vapors through said body.

A further object of the present invention is to provide a continuous vapor-phase treating process for petroleum distillates, allowing for the charging of fresh and the discharging of spent portions of the adsorbent polymerizing agent from the treatment zone without interruption of the treating procedure.

According to conventional practice of vapor-phase treatment of petroleum distillates, for example as set forth in the U. S. patents to Gray, Nos. 1,759,812-3-4, the adsorbent material is disposed in a vertical container or treating chamber and the petroleum distillates or vapors are passed downwardly through the adsorbent mass. The contact of the vapors with the adsorbent results in the formation of heavy, resinous liquid polymerization products which, due to the washing action of the vapor stream, are washed downwardly through the adsorbent mass. A natural result of this arrangement is that the polymers are in contact with the adsorbent material through substantially the same path as that taken by the vapors passing through said adsorbent mass, and hence under some conditions, a relatively large proportion of the adsorbent is occluded by said polymers, preventing access thereto by the vapors.

According to the method of treating vapors of petroleum distillates as set forth in this invention, the adsorbent polymerizing agent may be disposed in an elongated chamber or container and the distillate vapors passed longitudinally through the chamber. The polymers formed by the action of the adsorbent agent on certain constituents present in the vapors are allowed to drain vertically downwardly to the lower wall of the chamber, through a relatively short path as compared with the path taken by the vapors passing through the chamber, whence they may be removed in any suitable manner. The chamber is preferably disposed at a relatively large angle with respect to the vertical, such angle being preferably but a little less than the complementary angle of the angle of repose of the particular adsorbent material in use, and may ordinarily be in the neighborhood of 60°, whereby the adsorbent agent may be removed from the container by gravity upon necessity.

In the method of the present invention, petroleum distillate vapors are caused to pass through a body of adsorbent polymerizing agent characterized by the property of causing polymerization of certain constituents of said vapors, and said body of adsorbent polymerizing agent is disposed at an angle to the vertical and of such dimensions and proportions with respect to said angle of disposition as to cause the maximum length of path through which the condensed liquid polymers drain downwardly therethrough to be materially less than the minimum length of path of said vapors through said body, and preferably less than one-half the length of said minimum vapor path.

The method of the present invention may also comprise, if desired, the washing of the body of adsorbent polymerizing agent by means of a quantity of treated gasoline or other suitable solvent, concurrently with the passage of the vapors through said body, whereby the condensed polymers are continuously washed from the adsorbent body and drained, together with the washing solvent, from the treating chamber. When such a procedure is followed, the mixture of solvent and polymers may advantageously be subjected to a distillation process whereby the solvent may be returned for further washing action and the polymers withdrawn to waste or salvage as desired.

The method of the present invention may be carried out in an elongated container of circular or other suitable cross-section and a body of adsorbent polymerizing agent within said container, said container being provided with vapor ingress and egress means at opposite ends of said body of material, polymerizing agent charging and discharging means and condensed polymer discharging means, said container being of such size, shape and disposition that the body of material contained therein is disposed at an angle to the vertical and of such relative diameter and length in relation to said angle of disposition of said body that the maximum length of any vertical path within said body is materially less than the minimum path of vapors through said body in passing between the vapor ingress and egress means aforesaid.

Other objects of the invention will be brought out in the following description, or will be apparent therein.

The accompanying drawings illustrate several embodiments of apparatus in which the method of the present invention may be practiced, and referring thereto:

Fig. 1 is a side elevation of a preferred form of apparatus, showing an inclined treating chamber provided with a reflux polymer washing arrangement;

Fig. 2 is a transverse section thereof on line 2—2 in Fig. 1;

Fig. 3 is a sectional side elevation of an alternative form of treating chamber, showing one form of drain for the condensed polymers;

Fig. 4 is a transverse section thereof on line 4—4 in Fig. 3;

Fig. 5 is a sectional view corresponding to that shown in Fig. 4, showing an alternative form of condensed polymer drain;

Fig. 6 is a longitudinal section of another alternative form of treating chamber, provided with mechanically operable means for removal of spent adsorbent material;

Fig. 7 is a transverse section thereof on line 7—7 in Fig. 6;

Fig. 8 is a longitudinal elevation of a form of apparatus adapted for continuous operation, allowing of intermittent charging and discharging of fresh and spent portions of the adsorbent polymerizing agent, a portion of said container being broken away to show the interior detail;

Fig. 9 is a diagrammatic representation of the proportional relations of the diameter and length of the reaction chamber of the present invention, with relation to the angle of disposition thereof.

Referring to the drawings, there is shown in Figs. 1 and 2 a form of apparatus embodying the primary principles of the process functions, wherein an elongated chamber 1, of cylindrical or other suitable shape, is provided with distillate vapor pipes 2a and 2b, a charging door 4 and a discharging door 5 for the purpose of filling and emptying the chamber 1 with the adsorbent polymerizing agent. For the purpose of simplicity, the adsorbent polymerizing agent will hereinafter be referred to as "clay" but it will be understood that said agent may be of any suitable type, characterized by the property of causing polymerization of certain relatively low molecular weight compounds such as diolefins present in the petroleum vapors, with the formation of resinous compounds of higher molecular weight, hereinafter termed "polymers", upon contact therewith, said polymers being normally liquid at the temperatures involved in the vapor treatment.

A plurality of pipes 6, provided with valves 7, are shown as extending from the lower wall of the chamber 1, providing communication between said chamber and a manifold or header 9. The manifold 9 may be provided with a heating jacket, as shown, if desired and may comprise an inner tubular member 11 in communication with the lower ends of the pipes 6 and provided at its lower end with an outlet connection 12 through which the condensed polymers may be drained. This outlet may be provided with a suitable seal or trap such as shown at 13, if desired. The upper end of the member 11 may be connected to a condenser 15 through a pipe 14. The manifold 9 may further comprise an outer tubular member 11a surrounding the member 11 and providing an annular space 16 through which steam or other heating agent may be passed, connections for the inlet and exhaust of such agent being shown at 17. A drain connection may be provided for the manifold, as shown at 18, if desired.

Suitable means are provided in this form of device for washing the condensed polymers from the adsorbent clay, said clay being shown diagrammatically at 19 in Fig. 2. Such means may comprise a header 21 provided with a plurality of perforated pipes 21a disposed in the upper portion of the chamber 1 and provided with suitable connection to a source of solvent supply, as indicated at 22. It is preferable that the chamber 1 be provided with suitable insulation, not shown, surrounding the chamber 1, the manifold 9 and the inlet and outlet vapor lines 2, such insulation being for the purpose of maintaining the temperature within the chamber 1 and the vapor lines sufficiently elevated so that substantially no condensation of the vapors is realized, after the manner of common practise.

According to the method of the present invention, the operation of the form of apparatus above described may be as follows: The chamber 1 is filled with a suitable clay through door 4 and petroleum distillate vapors are passed through the chamber through the pipes 2a and 2b, it being immaterial to the broader aspects of the present invention whether said vapors are caused to move upwardly through the body of adsorbent material or downwardly therethrough. Upon contact of the vapors with the clay, polymerization of certain constituents of the vapors is effected, and the polymers thus formed are deposited upon the clay, and after sufficient accumulation will drain downwardly through the mass. The polymers may thus drain downwardly from their points of formation to the bottom wall 1a of the chamber 1, and will thence drain downwardly along said wall to one of the pipes 6, and thence be conducted through said pipe to the inner member 11 of the manifold 9 and out through the drain 12.

It will be seen that, in the above form of apparatus, the maximum path along which portions of the condensed polymers may drain (such as is shown, for example, by the dotted line $d$) is materially less than the minimum vapor path (shown by the dotted line $p$). It will be seen, also, that the length of this maximum polymer path as compared with the length of the minimum vapor path is a function of the diameter, length and angle of inclination of the clay body. Referring to Fig. 9, the chambers shown diagrammatically at A30°, B50° and C70°, represent three containers filled with clay, each having the same length of minimum vapor path (represented by the lines $V_p$) and the same length of maximum polymer path (represented by the line $P_p$), but having different angles of inclination, as designated. In this case, it will be seen that in order to preserve the relation of the paths $V_p$ and $P_p$ as found in A30°, it is necessary to reduce the diameter of the container C70° to about 40% of the diameter of that of A30°. It will thus be understood that the length and diameter of the container or the clay body will be of such proportion with respect to the angle of disposition thereof that the prescribed relation between the lengths of the respective paths aforesaid is obtained. I have found that, when the length of the minimum vapor path is caused to be in the neighborhood of or in excess of twice the length of the maximum polymer path, a very advantageous relationship exists, obtaining operation of the apparatus in such manner that the adsorbent polymerizing agent is maintained at high efficiency for a comparatively long period.

The expression "maximum path of condensed polymers" is used to denote, in general, the length of a vertical path through the body of adsorbent having the greatest length. It will be understood that, in some cases, for example when the petroleum vapors are admitted to the treating chamber through the pipe $2^a$ and withdrawn through the pipe $2b$, there will be a slight washing action of said vapors on the condensed polymers, tending to cause the same to drain through a path at some angle to the vertical, such as is indicated by the dotted line $d_1$, which will be slightly longer than the vertical drain path $d$. On the other hand, if the vapors are passed through the treating chamber in an upward direction from $2b$ to $2a$, the condensed polymers will be caused to drain through some such path as is shown by the dotted line $d_2$, somewhat shorter than the vertical path $d$. In this latter manner effective removal of the condensed polymerization products is obtained through a path materially shorter than the length of the vertical drainage path.

When it is desired to effect washing of the adsorbent body by the use of a solvent, such solvent may be supplied to the header 21 and caused to percolate downwardly through the adsorbent mass, washing the polymers with it, and then withdrawn from the chamber through the pipes 6 into the member 11. Steam or other heating agent may be supplied to the space 16 surrounding said member and the mixture of polymers and solvent may be subjected to a distillation whereby the solvent, being of lower boiling point than the polymers, is vaporized and delivered to the condenser 15 through the pipe 14. The condensed solvent may then be returned to the header 21 through the pipes 24 for further washing, and the polymers which have been substantially freed of solvent may be withdrawn at 12 as above described.

After a period of time, the adsorbent polymerizing agent or clay will become vitiated and will no longer effectively obtain formation of polymers, upon which the flow of vapors through the chamber may be stopped, the clay discharge door 5 opened, the spent clay removed and said discharge door closed. The chamber may then be charged with fresh clay through the door 4 and the operation repeated.

I have found it advisable to provide the pipes 6 with a column of granular material such as shown at $6a$, supported on screens $6b$, so that washing of the adsorbent material from the chamber into the header 9 will be prevented. Such granular material may comprise relatively coarsely crushed quartz, sand or the like, which may serve in the manner of a filter.

In the form of apparatus shown in Figs. 3 and 4, the treating chamber 25 is provided with an alternative form of polymer drain, which may comprise a channel or trough 26 secured to the lower wall of the chamber in any suitable manner as, for example, by welding, the portion $25a$ of the chamber wall immediately above the said trough being suitably perforated to allow passage of liquid from the interior of said chamber into said trough. The trough 26 may be provided at its upper and lower ends with charging and cleanout doors 27, as shown, and the lower end is provided with a condensed polymer drain 28 provided with a seal 29. The trough 26 is preferably filled with a relatively coarse granular material whereby short-circuiting of the vapors therethrough is prevented. This form of apparatus is not shown as provided with a solvent reflux arrangement, such as shown in Figs. 1 and 2, though it will be appreciated that it may be so provided, if desired.

Fig. 5 shows a chamber 30 provided with a modified form of polymer drain, formed by a plurality of overlapping spaced slats 31 extending longitudinally of the chamber and adjacent the bottom wall thereof and defining a space 32, to which passage of the adsorbent material 33 is prevented by virtue of said slats, and through which the condensed polymers may flow. Suitable means may be provided at desired points along the bottom wall of the chamber below the space 32, or at the lower end of the chamber for removal of the condensed polymers. Also, the space 32 may be filled with a granular material as above described, if desired.

Figs. 6 and 7 show at 33 an alternative form of treating chamber adapted to be disposed substantially horizontally with respect to the flow of vapors therethrough. Means are provided at either end of the chamber for ingress and egress of vapors, as shown at 34. Suitable charging doors or ports 35 are provided at the upper side of the chamber, and the form of clay removal means herein shown may comprise a screw-conveyor formed of two halves 36 and 37, right and left hand, respectively, said conveyor being mounted for rotation in a longitudinal trough or well 38 open to communication throughout its length with the interior of the chamber 33 at the bottom thereof. A clay discharge door 39 is provided in the bottom of the trough 38 adjacent the inner ends of the respective halves of the conveyor. Upon occasion, the clay discharge door 39 is removed, the screw-conveyor rotated in the proper direction by suitable driving means not shown, and the clay present within the chamber 33 is thus drawn inwardly through the trough 38 towards the discharge door 39, the clay present in the chamber being allowed to fall freely into said trough. A suitable drain connection may be provided as at 41 for the withdrawal of the condensed polymers.

The form of apparatus shown in Fig. 8 is adapted for intermittent charging of fresh and discharging of spent portions of clay without interruption of the flow of vapors through the chamber. As an illustration, I have shown a form of treating chamber such as above described and shown in Figs. 3 and 4, with the exception that a clay charger and discharger have been substituted for the charging and discharging doors. The clay charger may comprise a container 42 of any convenient dimensions and shape, provided with an upper valve 43 and a lower valve 44 and the discharger 45, which preferably is of the same cubical content as the charger 42, is provided with a similar valve arrangement, as shown at 46 and 47. The clay charger 42 may be provided with direct connection to a clay bin 48, as shown, or may be provided with a suitable hopper at the upper end thereof into which the clay may be dumped upon occasion.

In the operation of the above-described form of apparatus, assuming the chamber to be filled with clay, and the valves 43, 44, 46 and 47 to be closed, a flow of vapors is established therethrough. Upon the clay becoming somewhat vitiated, the valve 43 may be opened and the charger 42 filled with clay from said bin, the valve 43 is then closed, and the valves 44 and 46 opened, allowing a measured portion of the adsorbent material to flow outwardly of the chamber into the discharger 45. At the same time, the clay will flow from the charger 42 into the chamber, replacing the clay withdrawn. The valves 44 and 46 are then closed and the valve 47 opened, discharging the portion of spent clay to waste or treatment for recovery, as desired. It will be seen that in the above manner of operation, it is possible to discharge portions of spent clay and charge portions of fresh clay while the main clay body remains substantially sealed from the atmosphere, and thus maintain the clay body in a substantially active condition at all times, during vapor treatment, with a very slight loss of vapors during the charging operation. I have found that by the use of the above described arrangement considerable saving may be made in the amount of clay consumed in the treating operation, and at the same time more uniform treating results may be obtained, in that the vapors treated according to the above described method are consistently of optimum desired purity.

It will be understood that the refluxing of a washing solvent through the clay body may be incorporated in any of the above described modifications of the apparatus and that the continuous operation feature of the latter form may advantageously be incorporated in any of the previously described forms.

It will be further understood that the condensed polymers may be allowed to drain along the lower wall of the chamber and withdrawn at the lower end thereof in any suitable manner, without departing from the spirit of the invention, as, for the purposes of this invention, it is immaterial how the polymers are removed from the container.

It will be readily seen that the present invention is adapted for multiple installation, such as, for example, a plurality of relatively long tubular treating chambers disposed at a suitable angle to the vertical and provided with a clay charging manifold at one end and a clay discharging manifold at the other end, vapor ingress and egress means and condensed polymer withdrawing means.

I claim:

1. The method of purifying hydrocarbon vapors which comprises passing such vapors through a body of adsorbent polymerizing agent to cause polymerization of certain constituents of said vapors to form liquid polymers, said vapors being caused to pass through said adsorbent body in such manner as to cause said liquid polymers to drain from said body through paths shorter than the vertical free-fall path of the polymers and at an angle to said vertical free-fall path, said adsorbent body being disposed at an angle to the vertical and inclined to the horizontal, and said vapors being passed through said body in an upward direction.

2. The invention set forth in claim 1, said body being of such proportions and dimensions with respect to the angle of disposition thereof as to cause said polymers to drain from said body along paths having a maximum length materially less than the minimum length of path of said vapors through said body.

3. A process for refining hydrocarbon vapors which comprises passing the same in a direction having a substantial horizontal component through a treating zone elongated in said direction containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space.

4. A process for refining hydrocarbon vapors which comprises passing the vapors in a direction having a substantial horizontal component through a bed of polymerizing agent elongated in said direction and inclined to the horizontal, thereby forming liquid polymers, and draining the liquid polymers from said bed downwardly along paths at an angle to the vertical and shorter than the vertical free-fall path of the polymers.

5. A process for refining hydrocarbon vapors which comprises introducing the vapors into an elongated, horizontally inclined bed of polymerizing agent, passing the vapors lengthwise through said bed in the direction of upward inclination of the bed, and draining resultant liquid polymers downwardly through the bed along paths at an angle to the vertical and shorter than the vertical path of the polymers through the bed.

HENRY S. MONTGOMERY.